United States Patent
Onishi et al.

(10) Patent No.: US 12,542,199 B2
(45) Date of Patent: Feb. 3, 2026

(54) DATA PROCESSING METHOD, DATA PROCESSING DEVICE, AND DATA PROCESSING SYSTEM

(71) Applicant: JSR CORPORATION, Tokyo (JP)

(72) Inventors: Yuya Onishi, Tokyo (JP); Tomoki Nagai, Tokyo (JP)

(73) Assignee: JSR CORPORATION, Tokyo (JP)

( * ) Notice: Subject to any disclaimer, the term of this patent is extended or adjusted under 35 U.S.C. 154(b) by 1212 days.

(21) Appl. No.: 17/399,162

(22) Filed: Aug. 11, 2021

(65) Prior Publication Data

US 2021/0375403 A1 Dec. 2, 2021

Related U.S. Application Data

(63) Continuation of application No. PCT/JP2020/004640, filed on Feb. 6, 2020.

(30) Foreign Application Priority Data

Feb. 12, 2019 (JP) .................. 2019-022362

(51) Int. Cl.
*G16C 60/00* (2019.01)
*G06N 10/60* (2022.01)
(Continued)

(52) U.S. Cl.
CPC ............ *G16C 60/00* (2019.02); *G06N 10/60* (2022.01); *G16C 20/20* (2019.02); *G16C 20/70* (2019.02); *G16C 20/90* (2019.02)

(58) Field of Classification Search
None
See application file for complete search history.

(56) References Cited

U.S. PATENT DOCUMENTS

| | | | |
|---|---|---|---|
| 2011/0137841 A1 | 6/2011 | Yuta | |
| 2015/0310162 A1 | 10/2015 | Okuno et al. | |
| 2018/0032663 A1* | 2/2018 | Yoo | G16B 40/00 |

FOREIGN PATENT DOCUMENTS

| | | |
|---|---|---|
| EP | 2 323 080 | 5/2011 |
| EP | 2 889 791 | 7/2015 |

(Continued)

OTHER PUBLICATIONS

Fingerhuth, Mark, TomáBabej, and Peter Wittek. "Open source software in quantum computing." PloS one 13.12 (2018): e0208561. (Year: 2018).*

(Continued)

*Primary Examiner* — Karlheinz R. Skowronek
*Assistant Examiner* — Mary C Leverett
(74) *Attorney, Agent, or Firm* — Grüneberg and Myers PLLC

(57) ABSTRACT

A data processing method acquires a first calculated value by a first calculation method as a physical property value and a second calculated value by a second calculation method as the physical property value, of each of a plurality of first compounds whose true value of the physical property value is known. The method then generates a first correction model and a second correction model for correcting the first calculated value and the second calculated value, respectively, to the true value. The method stores, in a database, corrected values corrected by the first and second correction models of calculated values as the true values, where the calculated values are acquired by the first and second calculation methods as a physical property value of a second compound whose true value of the physical property value is unknown.

22 Claims, 11 Drawing Sheets

(51) Int. Cl.
*G16C 20/20* (2019.01)
*G16C 20/70* (2019.01)
*G16C 20/90* (2019.01)

(56) References Cited

FOREIGN PATENT DOCUMENTS

| JP | 2007-39437 | 2/2007 |
|---|---|---|
| WO | 2007/004546 | 11/2007 |
| WO | 2010/016109 | 2/2010 |
| WO | 2014/034577 | 3/2014 |

OTHER PUBLICATIONS

Pernot, Pascal, et al. "Prediction uncertainty of density functional approximations for properties of crystals with cubic symmetry." The Journal of Physical Chemistry A 119.21 (2015): 5288-5304. (Year: 2015).*

Cao, Yudong, Jhonathan Romero, and Alan Aspuru-Guzik. "Potential of quantum computing for drug discovery." IBM Journal of Research and Development 62.6 (2018): 6-1. (Year: 2018).*

Notice of Reasons for Refusal dated May 16, 2023, in Japanese Application No. 2020-572208, with English translation, 6 pages.

Office Action received for Chinese Patent Application No. 202080013555.3 mailed on Jul. 30, 2024, 7 pages with English translation.

International Search Report issued Apr. 21, 2020 in PCT/JP2020/004640 with English translation, 5 pages.

Written Opinion issued Apr. 21, 2020 in PCT/JP2020/004640 with English translation, 6 pages.

Hill et al., "*Materials science with large-scale data and informatics: Unlocking new opportunities,*" MRS Bulletin, vol. 41, Issue 5, May 2016, pp. 399-409.

Chinese Office Action issued in Chinese Patent Application No. 202080013555.3 dated Oct. 28, 2023, with English translation, 19 pages.

Qin Wu, et al., "Empirical correction to density functional theory for van der Waals Interactions", The Journal of Chemical Physics, vol. 116, No. 2, Jan. 8, 2002, pp. 515-524.

Extended European Search Report dated Oct. 13, 2022, in European Application No. 20754877.7, 12 pages.

Jain et al., "Commentary: The materials Project: A materials genome approach to accelerating materials innovation", APL Materials, vol. 1, 2013, p. 011002-1-011002-11.

Saal et al., "Materials Design and Discovery with High-Throughput Density Functional Theory: The Open Quantum Materials Database (OQMD)", Jom, vol. 65, No. 11, Sep. 28, 2013, pp. 1501-1509.

Toher et al., "Automated computation of materials properties", Department of Mechanical Engineering and Materials Science, Duke University, arxiv.org, May 2018, pp. 1-25.

Official Communication issued in European patent application No. 20 754 877.7-1122 on Jul. 21, 2025, 7 pages.

* cited by examiner

| | IP | | |
|---|---|---|---|
| COMPOUND | TRUE VALUE | DFT | VQE |
| CK1 | IP_1 | IPD_1 | IPV_1 |
| CK2 | IP_2 | IPD_2 | IPV_2 |
| ⋮ | ⋮ | ⋮ | ⋮ |
| CKn | IP_n | ///// | IPV_n |
| ⋮ | ⋮ | ⋮ | ⋮ |

| | IP | | |
|---|---|---|---|
| COMPOUND | TRUE VALUE | DFT | VQE |
| CK1 | IP_1 | IPD_1 | IPV_1 |
| CK2 | IP_2 | //IPD_2// | IPV_2 |
| ⋮ | ⋮ | ⋮ | ⋮ |
| CKn | IP_n | ///// | IPV_n |
| ⋮ | ⋮ | ⋮ | ⋮ |

FIG.11

| COM-POUND | CHEMICAL STRUCTURE | IP | EA |
|---|---|---|---|
| , | , | , | , |
| , | , | , | , |
| , | , | , | , |
| , | , | , | , |
| , | , | , | , |
| , | , | , | , |
| , | , | , | , |
| , | , | , | , |
| , | , | , | , |
| , | , | , | , |
| , | , | , | , |
| , | , | , | , |
| , | , | , | , |
| , | , | , | , |

102a

FIRST COMPOUNDS (upper group)

SECOND COMPOUNDS → FIRST COMPOUNDS (lower group)

DATA PROCESSING METHOD, DATA PROCESSING DEVICE, AND DATA PROCESSING SYSTEM

CROSS-REFERENCE TO RELATED APPLICATION(S)

This application is a continuation of PCT international application Ser. No. PCT/JP2020/004640 filed on Feb. 6, 2020, which designates the United States; and which claims priority to Japanese Application No. 2019-022362, filed Feb. 12, 2019. The entire contents of each of these applications are incorporated herein by reference.

FIELD

The present invention relates to a data processing method, a data processing device, and a data processing system.

BACKGROUND OF THE INVENTION

Recently, materials informatics, which combines materials science and data science, is being focused as a method of new materials search. In materials informatics, materials search is conducted by analyzing a database containing various types of information such as structures and physical properties of materials (compounds).

Specifically, in materials informatics, materials search is conducted through data mining and machine learning using a database (see Non Patent Literature 1, for example).

SUMMARY OF THE INVENTION

In order to solve the problem described above and to achieve the goal, in the present invention, the present invention discloses a data processing method comprising:
   a first acquisition step of acquiring a first calculated value by a first calculation method as a physical property value of each of a plurality of first compounds, a true value of the physical property value of the first compound being known;
   a second acquisition step of acquiring a second calculated value by a second calculation method as the physical property value of each of the first compounds, the second calculation method being able to obtain a calculation result in a region in which the first calculation method is unable to obtain a calculation result;
   a generation step of generating a first correction model for correcting the first calculated value to the true value and a second correction model for correcting the second calculated value to the true value;
   a third acquisition step of acquiring a third calculated value by the first calculation method as a physical property value of a second compound, a true value of the physical property value of the second compound being unknown;
   a first storing step of correcting, by using the first correction model, the third calculated value acquired in a region including a region in which at least the first calculation method is able to obtain a calculation result, and storing the corrected value as the true value of the physical property value of the second compound in a database;
   a fourth acquisition step of acquiring a fourth calculated value by the second calculation method as the physical property value of the second compound in a region including a region in which at least the first calculation method is unable to obtain a calculation result; and
   a second storing step of correcting the fourth calculated value by using the second correction model, and storing the corrected value as the true value of the physical property value of the second compound in the database.

Further, the present invention discloses a data processing device comprising:
   an acquisition unit configured to acquire a first calculated value by a first calculation method as a physical property value of each of a plurality of first compounds, a true value of the physical property value of the first compound being known, and configured to acquire a second calculated value by a second calculation method as the physical property value of the first compound, the second calculation method being able to obtain a calculation result in a region in which the first calculation method is unable to obtain a calculation result;
   a generation unit configured to generate a first correction model for correcting the first calculated value to the true value and a second correction model for correcting the second calculated. value to the true value; and
   a storage unit configured to correct a third calculated value by using the first correction model, the third calculated value being acquired by the acquisition unit by the first calculation method as a physical property value of a second compound, a true value of the physical property value of the second compound being unknown, the third calculated value being acquired in a region including a region in which at least the first calculation method is able to obtain a calculation result, configured to store the corrected value in a database as the true value of the physical property value of the second compound, configured to correct a fourth calculated value by using the second correction model, the fourth calculated value being acquired by the acquisition unit by the second calculation method as the physical property value of the second compound in a region including a region in which at least the first calculation method is unable to obtain a calculation result, and configured to store the corrected value in the database as the true value of the physical property value of the second compound.

Further, the present invention discloses a data processing system comprising:
   an acquisition unit configured to acquire a first calculated value by a first calculation method as a physical property value of each of a plurality of first compounds, a true value of the physical property value of the first compound being known, and configured to acquire a second calculated value by a second calculation method as the physical property value of each of the first compounds, the second calculation method being able to obtain a calculation result in a region in which the first calculation method is unable to obtain a calculation result;
   a generation unit configured to generate first correction model for correcting the first calculated value to the true value and a second correction model for correcting the second calculated value to the true value; and
   a storage unit configured to correct a third calculated value by using the first correction model, the third calculated value being acquired by the acquisition unit by the first calculation method as a physical property value of a second compound, a true value of the physical property value of the second compound being unknown, the third calculated value being acquired in a region including a region in which at least the first calculation method is able to obtain a calculation result, configured to store the corrected value in a database as the true value of the physical property value of the second compound, configured to correct a fourth calculated value by using the second correction model, the fourth calculated value being acquired by the acquisition unit by the second calculation method as the physical property value of the second compound in a region including a region in which at least the first calculation method is unable to obtain a calculation result, and configured to store the corrected value in the database as the true value of the physical property value of the second compound.

BRIEF DESCRIPTION OF THE DRANINGS

Figure 7:
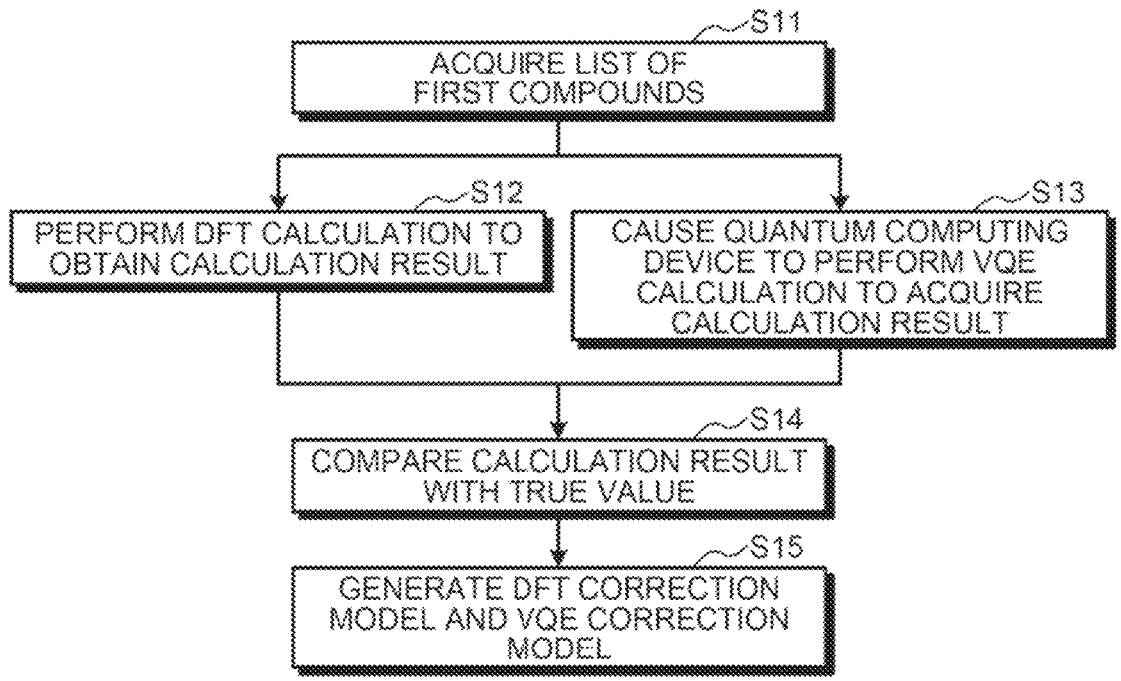
FIG. 7 is a flowchart illustrating detailed operations of Step S1 in the flowchart in FIG. 5.
Figure 9:
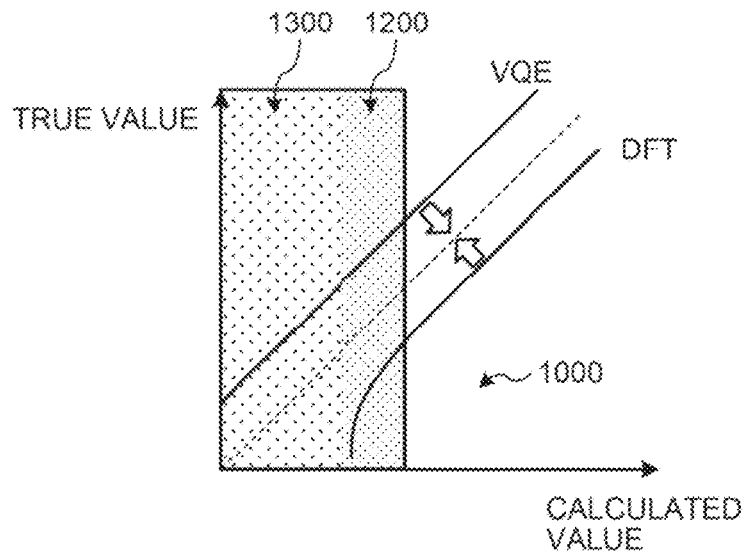

FIG. 9 a diagram illustrating the processing performed by the generation unit in FIG. 7.

Figure 5:
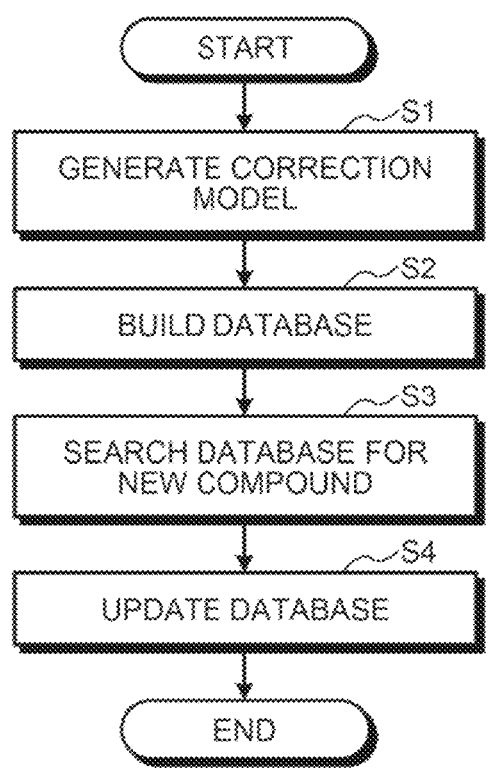
FIG. 5 is a flowchart illustrating example operations of the data processing system according to the embodiment.
Figure 10:
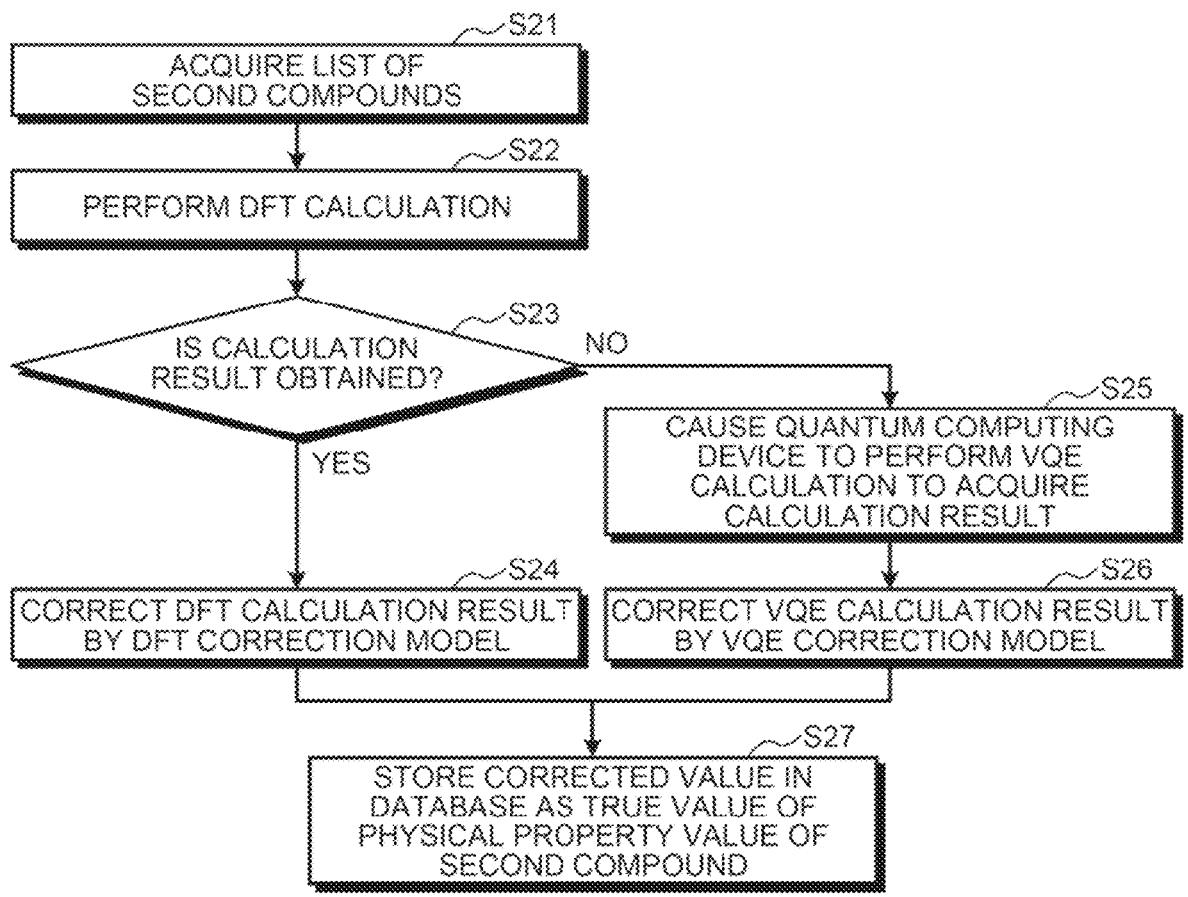

FIG. 10 is a flowchart illustrating detailed operations of Step S2 in the flowchart in FIG. 5.

FIG. 11 is a diagram illustrating a database after the processing at Step S2.

Figure 12:
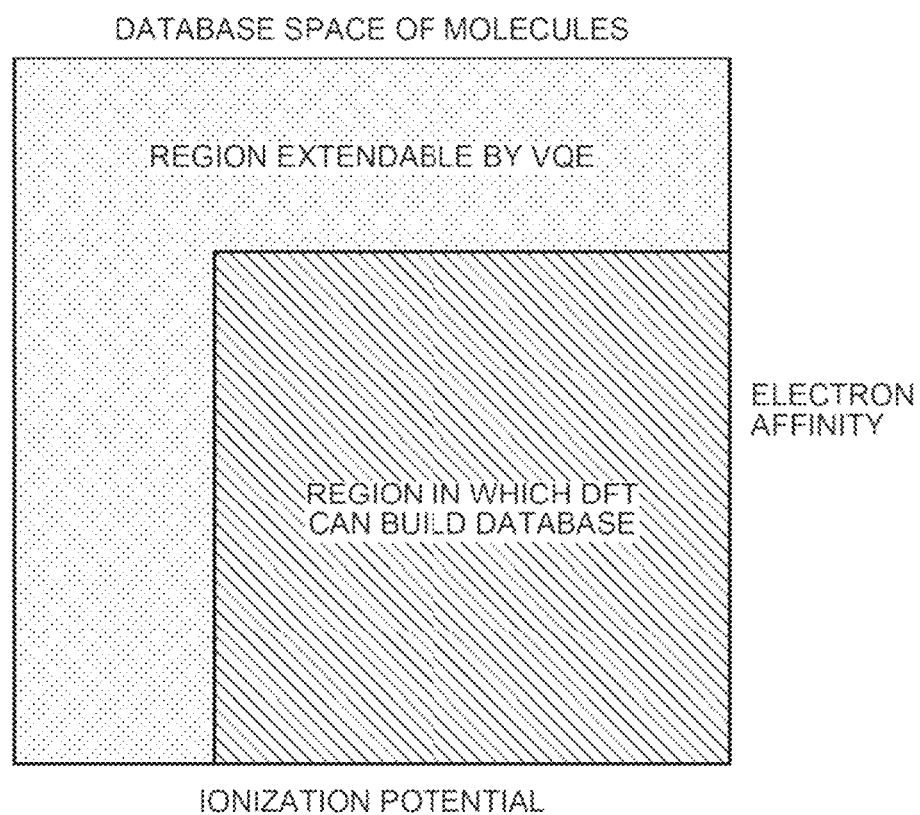

FIG. 12 is a diagram illustrating a result of the processing at Step S2.

Figure 13:
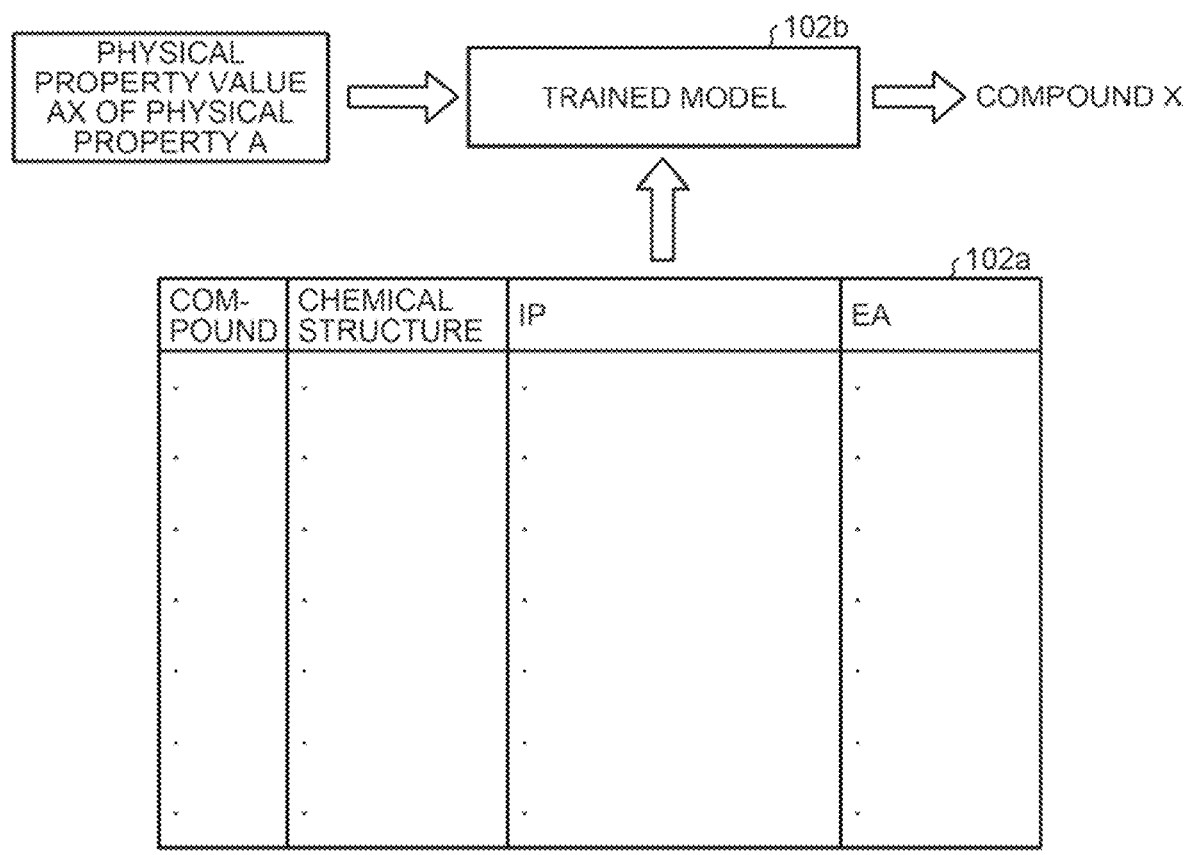

FIG. 13 is a diagram illustrating an operation of a search unit.

Figure 14:
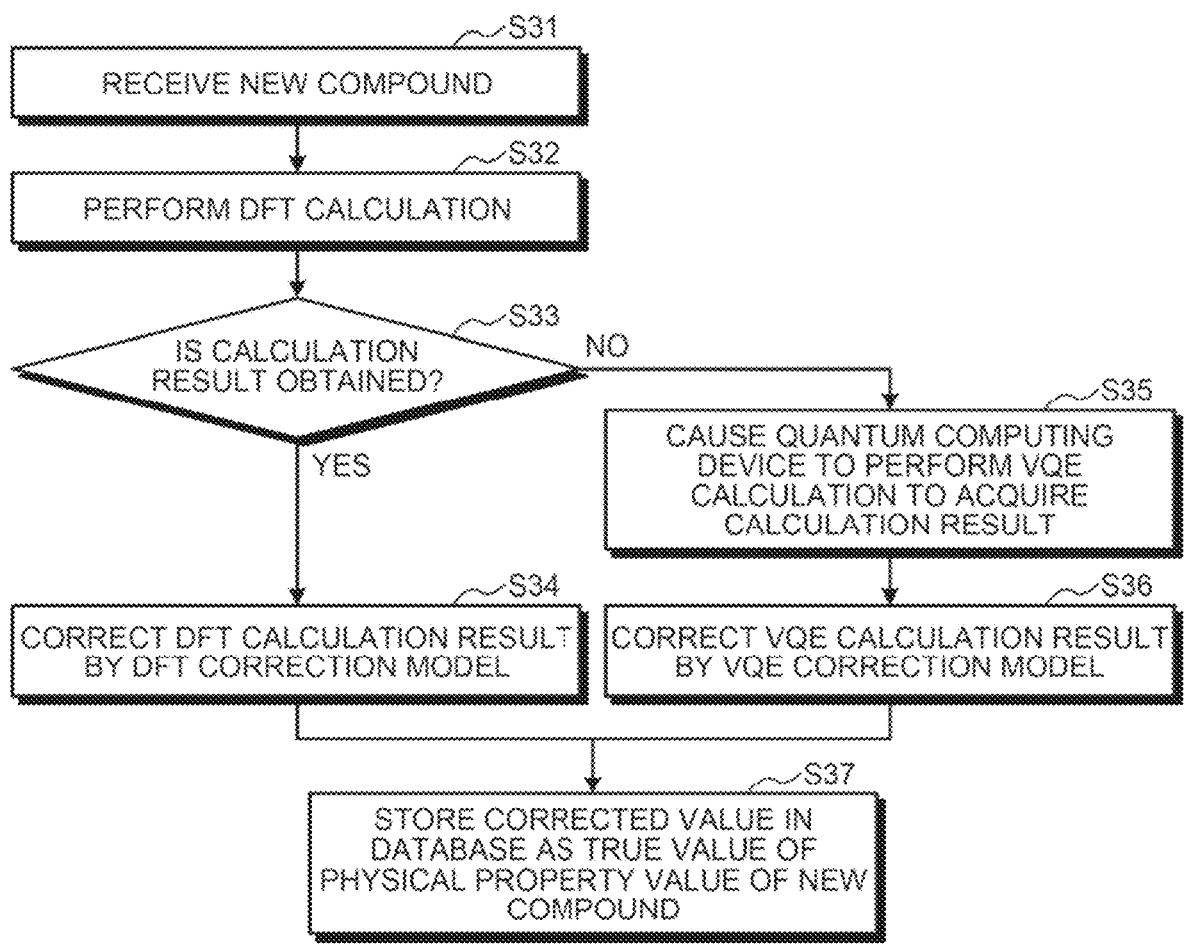

FIG. 14 is a flowchart illustrating detailed operations of Step S4 in the flowchart in FIG. 5.

DETAILED DESCRIPTION

The following describes an embodiment of a data processing method, a data processing device, and a data processing system according to the present invention in detail with reference to the accompanying drawings. Specifically, the following describes a system that implements the data processing method as an embodiment disclosed in the present specification.

Embodiment

Figure 1:
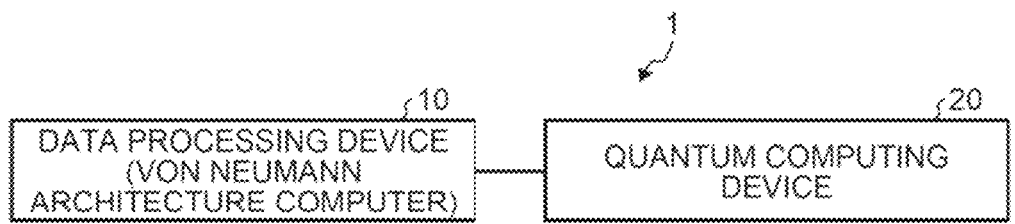
FIG. 1 is a diagram illustrating an example general configuration of a data processing system according to an embodiment.

FIG. 1 is a diagram illustrating an example general configuration of a data processing system 1 according to an embodiment. As illustrated in FIG. 1, the data processing system 1 according to the embodiment includes a data processing device 10 and a quantum computing device 20. The devices illustrated in FIG. 1 can be in direct or indirect communication with each other via a network such as a local area network (LAN) or a wide area network (WAN).

The data processing device 10 is a von Neumann architecture computer, or what is called a classical computer compared to a quantum computer that implements parallel computing by use of quantum superposition. The data processing' device 10 illustrated in FIG. 1 is, for example, a workstation that can perform density functional theory (DFT) calculations.

The quantum computing device 20 is implemented by a quantum computer or a quantum annealer. The quantum computing device 20 is not a quantum computer that implements perfect error correction but a noisy intermediate-scale quantum device (NISQ) that outputs calculation results including noise. The quantum computing device 20 illustrated in FIG. 1 can implement variational quantum eigensolver (VQE), for example.

Figure 2:
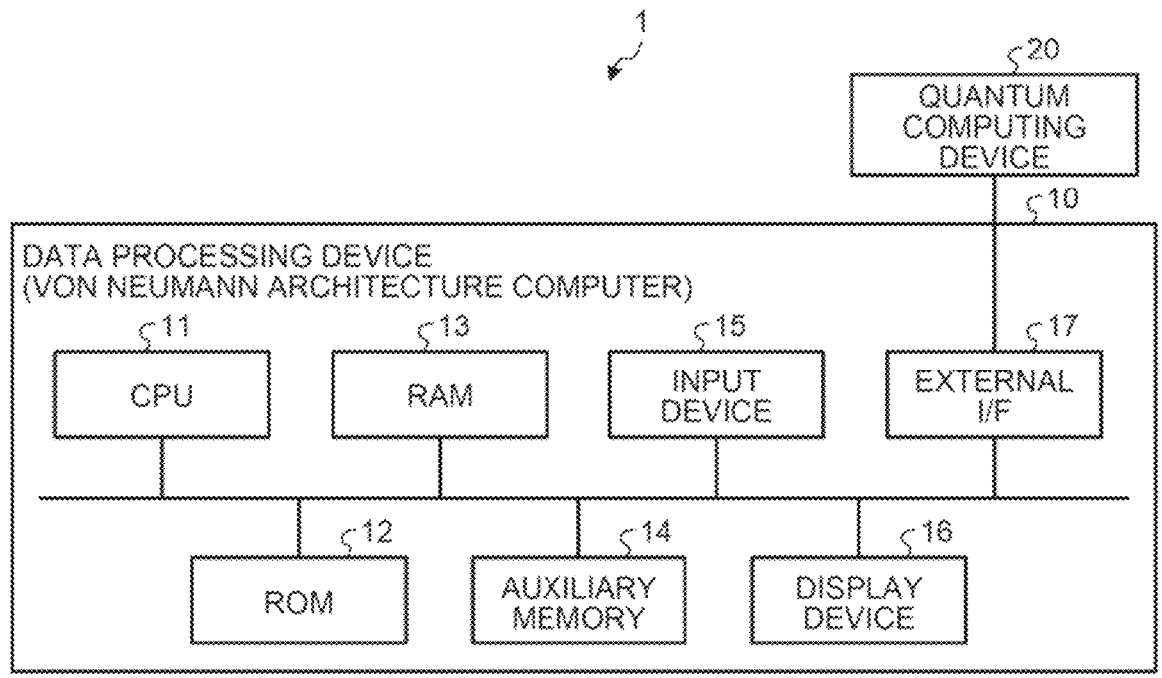
FIG. 2 is a diagram illustrating an example hardware configuration of a data processing device according to the embodiment.

FIG. 2 is a diagram illustrating an example hardware configuration of the, data processing device 10. As illustrated in 2, the data processing device 10 includes a central processing unit (CPU) 11, a read only memory (ROM) 12, a random-access memory (RAM) 13, an auxiliary memory 14, an input device 15, a display device 16, and an external I/F 17.

The CPU 11 collectively controls the operations of the data processing device 10 by executing a computer program to implement functions of the data processing device 10. The functions of the data processing device 10 will be described later.

The ROM 12 is a non-volatile memory that stores therein various types of data (information written in the production of the data processing device 10) including a computer program for booting the data processing device 10. The RAM 13 is a volatile memory that provides a working area for the CPU 11. The auxiliary memory 14 stores therein various types of data such as the computer program executed by the CPU 11. The auxiliary memory 14 is configured by, for example, a hard disk drive (HDD).

The input device 15 is a device through which a user performs various types of operations on the data processing device 10. The input device 15 is configured by, for example, a mouse, a keyboard, and a touch panel or a hardware key.

The display device 16 displays various types of information. The display device 16 displays, for example, a processing result of the CPU 11 and a graphical user interface (GUI) through which operations of the user are input. The display device 16 is, for example, a liquid crystal display, an organic electro luminescence display, or a cathode ray tube display. The display device 16 may be integrated with the input device 15 to configure, for example, a touch display.

The external I/F 17 is an interface for connecting the data processing device with (communicating with) an eternal device such as the quantum computing device 20.

Figure 3:
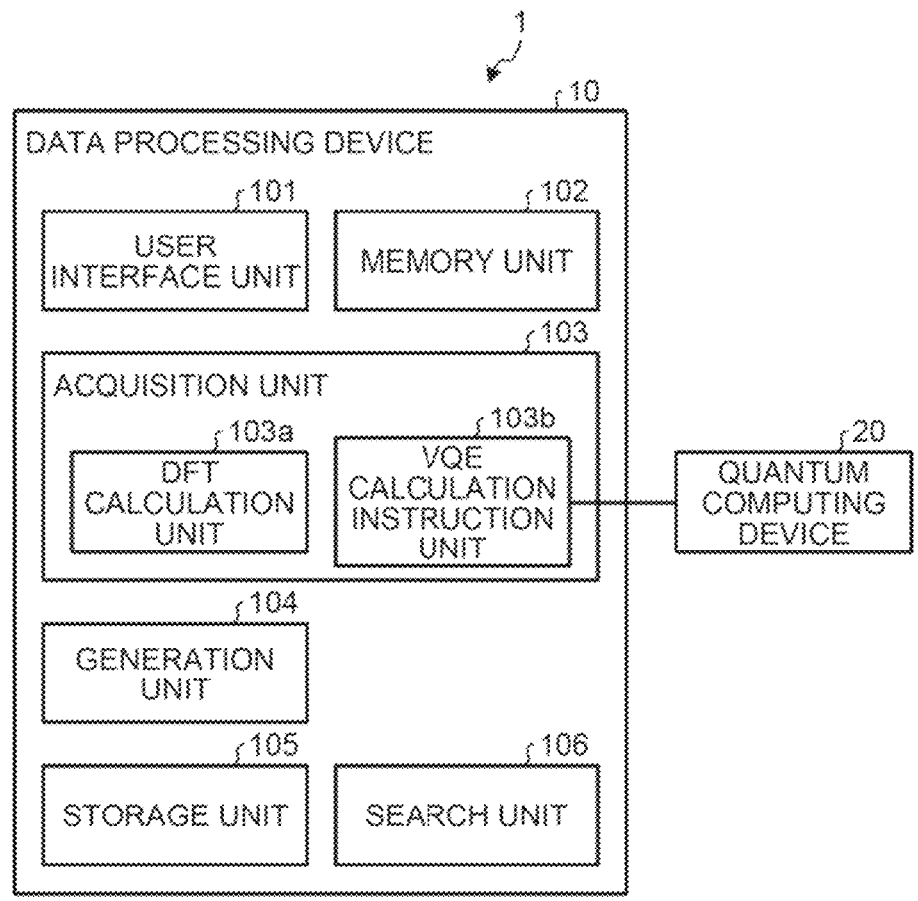
FIG. 3 is a diagram illustrating example functions of the data processing device according to the embodiment.

FIG. 3 is a diagram illustrating example functions of the data processing device 10. Although FIG. 3 illustrates only the functions relating to the embodiment, the functions of the data processing device 10 are not limited to these examples. As illustrated in FIG. 3, the data processing device 10 includes a user interface unit 101, a memory unit 102, an acquisition unit 103, a generation unit 104, a storage unit 105, and a search unit 106.

The user interface unit 101 has a function of receiving an input from the user and a function of displaying various types of information. The user interface unit 101 implemented by, for example, the input device 15 and the display device 16 illustrated in FIG. 2.

The memory unit 102 is implemented by, for example, the auxiliary memory 14 (e.g., HDD) illustrated in FIG. 2. The memory unit 102 stores therein a database (compound database) that associates compounds with chemical features of the compounds for use in implementing the data processing method according to the embodiment. Specifically, the memory unit 102 stores therein a database that associates a compound with, for example, a numerical value (molecular descriptor) indicating a feature of a partial structure of the compound and a true value of a physical property value of the compound.

Figure 4:
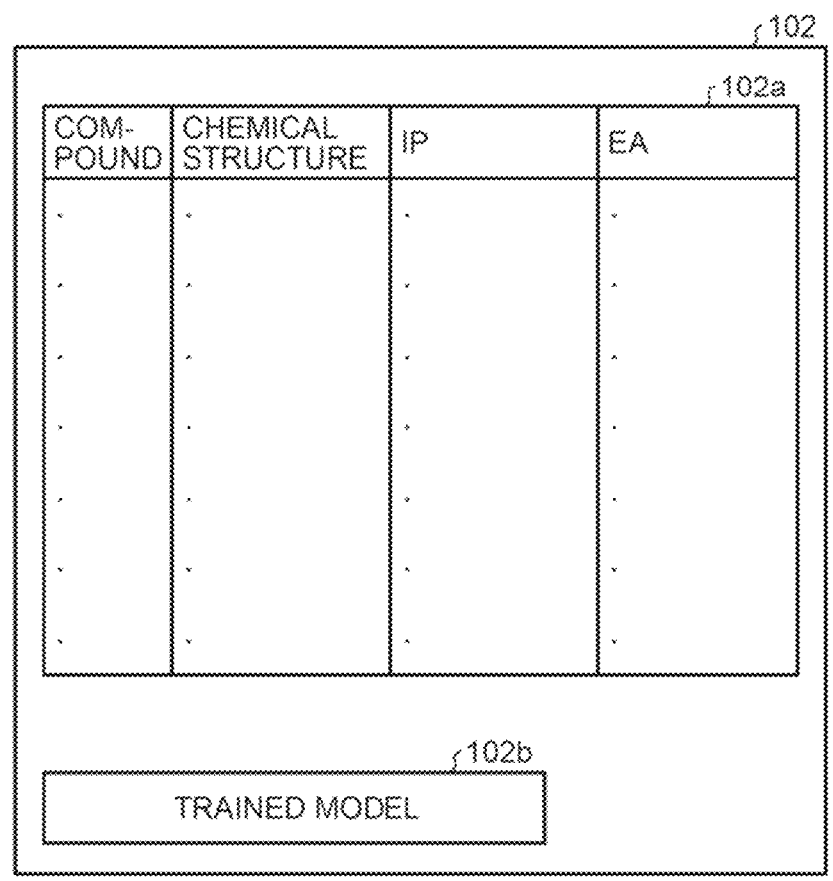
FIG. 4 is a diagram illustrating a memory unit illustrated in FIG. 3.

FIG. 4 is a diagram illustrating the memory unit in FIG. 3. As illustrated in FIG. 4, for example, the memory unit 102 stores therein a database 102a that contains compounds each associated with a character string (molecular descriptor) indicating a chemical structure, a true value of ionization potential (IP), and a true value of electron affinity (EA). The true values of the physical property values registered. in the database 102a may be empirical values obtained experimentally or calculated values obtained by accurate calculation.

As illustrated in FIG. 4, the memory unit 102 stores therein a trained model 102b as data for use in implementing the data processing method according to the embodiment. The trained model 102b is used for the processing performed by the search unit 106, which will be described later. The trained model 102b is generated by machine learning using training data The training data for generating the trained model 102b is, for example, a list of compounds whose true values of ionization potential and electron affinity are known as a true value of a physical property value of a physical property A. The training data is, for example, the database 102a. The training data may be a database different from the database 102a but having the same structure as that of the database 102a The training data may be the database 102a and a database different from the database 102a but having the same structure as that of the database 102a.

When a user inputs a desired physical property value "AX" (an example of a certain feature) of a physical property A, the trained model 102b estimates a new compound having the physical property value "AX" and outputs the estimated. result. The physical property A is, for example, ionization potential and electron affinity. When, for example, the trained model 102b receives an input of a physical property value "AX" of ionization potential as a physical property value of the physical property A from the search unit 106, which will be described later, the trained model 102b outputs a character string indicating a chemical structure estimated to have the physical property value "AX". When the trained model 102b receives an input of a physical property value "AX" of electron affinity as a physical property value of the physical property A from the search unit 106, which will be described later, the trained model 102b outputs a character string indicating a chemical structure estimated to have the physical property value "AX". When the trained model 102b receives an input of a physical property value "AX1" of ionization potential and a physical property value "AX2" of electron affinity as physical property values of the physical property A, the trained model 102b outputs a character string indicating a chemical structure estimated to have the physical property value "AX1" and the physical property value "AX2" from the search unit 106, which will be described later. The trained model 102b may be generated by the data processing device 10 or by other devices.

The data processing device 10 performs a new materials search by using database 102a as described above. The number or possible compounds for a new compound is theoretically enormous, whereas the number of compounds registered in the database 102a with physical property values is far short of such possible compounds. To increase the amount of information stored in the database 102a for use in new materials search, the data processing device 10 operates with the quantum. computing device 20 and performs the data processing method to be described below. FIG. 5 is a flowchart illustrating example operations of the data processing system according to the embodiment. The following describes the steps of the flowchart.

(Step S1)

First, the data processing device 10 generates a correction model (Step S1). Step S1 is performed by the acquisition unit 103 and the generation unit 104 illustrated in FIG. 3.

Figure 6:
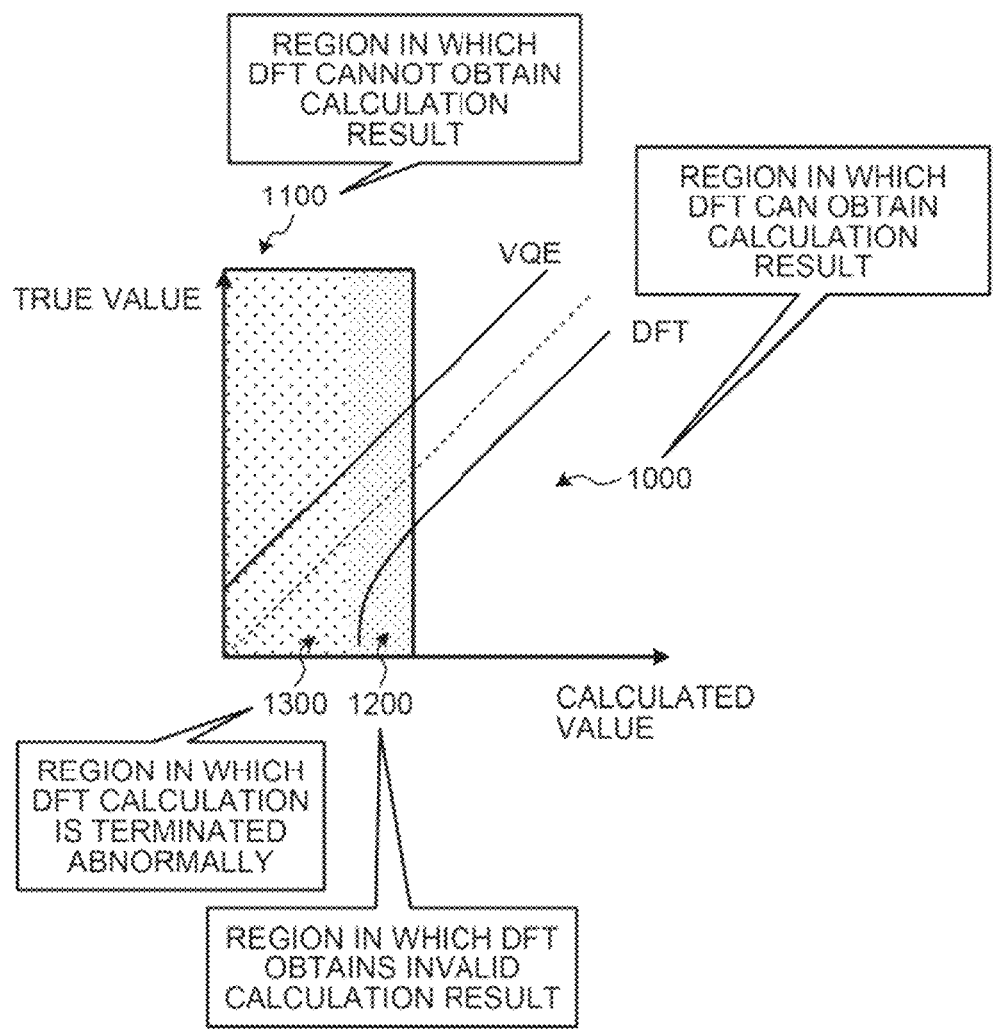
FIG. 6 is a diagram illustrating a theoretical tendency of the results of density functional theory (DFT) calculations and variational quantum eigensolver (VDE) calculations.

At Step S1, the acquisition unit 103 acquires a first calculated value by a first calculation method as a physical property value of a plurality of first compounds whose true value of the physical property value is known (first acquisition step). In the embodiment, the first calculation method is LFT described above and is performed by a GFT calculation unit 103a included in the acquisition unit 103. At Step Sl, the acquisition unit 103 acquires a second calculated value by a second calculation method as a physical property value of the first compounds (second acquisition step). In the embodiment, the second calculation method is VQE described above and is performed when a VQE calculation instruction unit 103b included in the acquisition unit 103 sends a computational instruction to the quantum computing device 20. At Step S1, the generation unit 104 generates a first correction model for correcting the first calculated value to the true value and a second correction model for correcting the second calculated value to the true value (generation step). The QE calculation as an example of the second calculation method can obtain a calculation result in a region in which the first calculation method (DFT) cannot obtain a calculation result. Details will be described with reference to FTG. 6. FIG. 6 illustrates the relation between the DFT calculation result and the true value and the relation between the VQE calculation result and the true value with the horizontal axis indicating the calculated value of ionization potential and the vertical axis indicating the true value of ionization potential. The relations illustrated in FIG. 6 are presented for illustrative purposes only in order to explain the concept of the data processing method according to the embodiment, and thus are not always applied to the calculation results of every physical property including the actual calculation results of ionization potential.

As illustrated in FIG. 6, the DFT calculation can obtain a calculation result in a region 1000, whereas the DFT calculation cannot obtain a calculation result in a region 1100. The region 1000 is a region in which the DFT calculation can obtain a calculation result correlated with the true value. In other words, the region 1000 is a region in which the DFT calculation can obtain a correct result qualitatively, or can obtain a valid result.

The region 1100 includes a region 1200 in which the DET calculation obtains an invalid calculation result and a region 1300 in which the DFT calculation is terminated abnormally. Although the DFT calculation can obtain a calculation result in the region 1200, the calculation result is less correlated with the true value than the calculation result obtained in the region 1000.

The VQE calculation, on the contrary, can obtain a calculation result theoretically in any region, and can obtain a correct calculation result qualitatively. As illustrated in FIG. 6, the VQE calculation performed by the NISQ (quantum computing device 20) obtains calculated values that statistically contain a certain level of noise. In other words, the VQE calculation can obtain a correct calculation result qualitatively even if the compound is included in the region 1100 in which the DFT calculation cannot obtain a calculation result. Compared to the DFT calculation, the VQE calculation takes time. To perform. high-speed processing, the DFT calculation is used for molecules that can be calculated by DFT calculation in collecting data.

In the embodiment, at Step S1, the generation unit 104 compares the true value with the first calculated value (DFT calculation result) and the second calculated value (VQE calculation result) for each of the first compounds. The generation unit 104 then generates the first correction model (DFT correction model) in a range in which the first calculated value is correlated with the true value, and generates the second correction model (VQE correction model) in a range in which the second calculated value is correlated with the true value.

Figure 8:
FIG. 8 is a diagram illustrating processing performed by an acquisition unit and a generation unit in FIG. 7.

Detailed operations of Step S1 are described with reference to FIGS. 7 to 9. FIG. 7 is a flowchart illustrating detailed operations of Step S1 in the flowchart in FIG. 5. FIG. 8 is a diagram illustrating the processing performed by the acquisition unit 103 and the generation unit 104 in FIG. 7. FIG. 9 is a diagram illustrating the processing performed by the generation. unit 104 in FIG.

As illustrated in FIG. 7, the acquisition unit 103 acquires a list of first compounds whose true value of a physical property value is known (Step S11). The acquisition unit 103 acquires data from, for example, the database 102a stored in the memory unit 102. At Step S11, the acquisition unit 103 may acquire the "list of compounds whose true values of ionization potential and electron affinity are known" from an external device via the user interface unit 101.

The DFT calculation unit 103a generates an expression for DFT calculation from the chemical structure of a first compound, and performs the DFT calculation to acquire a calculation result (Step S12). Simultaneously with Step S12, the VQE, calculation instruction unit 103b generates an expression for VQE calculation from the chemical structure of the first compound and transmits the generated expression to the quantum computing device 20 to cause the quantum computing device 20 to perform the VQE calculation and acquires a calculation result (Step S13). Step S12 may be performed before Step S13 or after Step S13.

FIG. 8 is a diagram illustrating an example operation of the acquisition unit 103 in acquiring calculation results of ionization potential. The upper table in FIG. 8 indicates that the DFT calculation obtains a result of "IPD_1" and the VQE calculation obtains a result of "IPV_1" of a compound "CK1" whose true value is "IP_1". In the same manner, the upper table in FIG. 8 indicates that the DFT calculation obtains a result of "IPD_2" and the VQE calculation obtains a result of "IPV_2" of a compound "CK2" whose true value is "IP_2". The upper table in FIG. 8 also indicates that the VQE calculation. obtains a result of "IPV_n" but the DFT calculation has failed to obtain a result or a compound "CKn" whose true value is "IP_n". In other words, the compound "CKn" is a compound included in the region 1300 in which the DFT calculation cannot obtain a calculation result.

Referring to FIG. 7, the generation unit 104 compares the calculation results with the true values (Step S14). At Step S14, the generation unit 104 determines whether the DFT calculation result is correlated with the true value. In the same manner, at Step S14, the generation unit 104 determines whether the VQE calculation result is correlated with the true value. In the lower table in FIG. 8, the generation unit 104 determines that the calculation result "IPD_2" of DFT is not correlated with the true value. This determination indicates that the result obtained by the DFT calculation for the compound "CK2" is included in the region 1200. In the example illustrated in FIG. 6, all the results of the VQE calculation are determined to be correlated with the true values.

The generation unit 104 then. generates the DET correction model and the VQE correction model (Step S15).

The generation unit 104 generates the DFT correction model for correcting the DPT calculation result to the true value when, for example, the DET calculation result is included in the region 1000 as illustrated in FIG. 9. The generation unit 104 generates the VQE correction model for correcting the VQE calculation result to the true value as illustrated in FIG. 9. At Step S1, the DFT calculation and the VQE calculation are performed to generate the DFT correction model and the VQE correction model regarding ionization potential. Regarding electron affinity, the DFT calculation and the VQE calculation are also performed to generate a DFT correction model and a VQE correction model.

Using the DFT correction model and the VQE correction model generated at Step S1 enables a wider variety of molecules to be corrected, which will be described below at Step S2.

(Step S2)

Referring to FIG. 5, the data processing device 10, after Step S1, builds a database (Step S2). Step S2 is performed by the acquisition unit 103 and the storage unit 105 illustrated in FIG. 3.

At Step S2, the acquisition unit 103 (DAFT calculation unit 103a) acquires a third calculated value by the first calculation method (DFT) as a physical property value of a second compound whose true value of the physical property value is unknown (third acquisition step). The storage unit 105 corrects, by using the first correction model (DFT correction model), the third calculated value acquired in a region including a region (region 1000) in which at least the first calculation method. (LIFT) can obtain a calculation result, and stores the corrected value in the database 102a as the true value of the physical property of the second compound (first storing step).

The acquisition unit 103 (VQE calculation instruction unit 103b) acquires, by the second calculation method (VQE), a fourth calculated value in a region including a region (region 1100) in which at least the first calculation method cannot obtain a calculation result as a physical property value of the second compound (fourth acquisition step). The storage unit 105 corrects, by using the second correction model (VQE correction model), the fourth calculated value, and stores, in the database 102a, the corrected value as the true value of the physical property value of the second compound (second storing step).

Detailed operations of Step S2 are described with reference to FIGS. 10 to 12. FIG. 10 is a flowchart illustrating detailed operations of Step S2 in the flowchart in FIG. 5. FIG. 11 is a diagram illustrating the database after the processing at Step S2. FIG. 12 is a diagram illustrating the result of the processing at Step S2.

As illustrated in FIG. 10, the acquisition unit 103 acquires a list of second compounds whose true value of the physical property value is unknown. (Step S21). For example, the user interface unit 101 acquires the "list of compounds whose true values of ionization potential and electron affinity are unknown" input by a user, and transmits the list to the acquisition unit 103. The number of compounds included in the list of second compounds is greater than the number of compounds included in the list of first compounds. The processes at and after Step S22 described below are performed repeatedly for every compound included in the list.

The DFT calculation unit 103a performs the DFT calculation on the second compound (Step S22), and the storage unit 105 determines whether the DFT calculation has obtained a calculation result (Step S23). Specfically, the storage unit 105 determines whether the calculation performed by the DFT calculation unit 103a is terminated abnormally, or determines whether the calculation result acquired by the DFT calculation unit 103a is included in the region 1200. In other words, the storage unit 105 determines whether the calculation result obtained by the DFT calculation is included in the region 1000.

The following describes an example determination method. The storage unit 105 obtains, for example, an approximate function by a first-order approximation for a region in which the DFT calculation results are correlated with the true values that have been known through experiments. When a value obtained by the DFT calculation deviates from a line extrapolated by the approximate function, or when the value is in the region 1200, the storage unit 105 determines that the DFT calculation has failed to obtain a calculation result. The storage unit 105 also determines whether the value obtained by the DFT calculation is a valid result by using a predetermined threshold corresponding to the subject physical property. For example, in obtaining an IP value by the DFT calculation, it is known that no valid calculation result can be obtained in the region at or below 2 eV. If the value of IP obtained by the DFT calculation is at or below 2 eV, the storage unit 105 determines that the DFT calculation has failed to obtain a calculation result.

Alternatively, the storage unit 105 performs stability analysis of solutions to determine whether the DFT calculation has obtained a calculation result. The storage unit 105, for example, examines whether any singlet instabilities exist in unrestricted DFT wave functions. If singlet instabilities exist, the storage unit 105 determines that the DFT calculation has failed to obtain a calculation result. If not, the storage unit 105 determines that the DFT calculation has obtained a calculation result.

If the DFT calculation obtains a calculation result (Yes at Step S23), the storage unit 105 corrects the DFT calculation result by using the DFT correction model (Step S24), and stores the corrected value in the database 102a as a true value of the physical property value of the second compound (Step S27).

If the DFT calculation has failed to obtain a calculation result (No at Step S23), the VQE calculation instruction unit 103b causes the quantum computing device 20 to perform the VQE calculation, and acquires a result (Step S25). The storage unit 105 then corrects the VQE calculation result by using the VQE correction model (Step S26), and stores the corrected value in the database 102a as the true value of the physical property value of the second compound (Step S27).

With the processing at Step S2 (Steps S21 to S27), the true value of ionization potential and the true value of electron affinity can be obtained for many second compounds. The second compounds thus can be registered in the database 102a as first compounds as illustrated in FIG. 11, and the amount of information stored in the database 102a can be significantly increased. Theoretically, as illustrated in FIG. 12, the database space of molecules can be increased for both ionization potential and electron affinity by combining a region in which DFT can build a database with a region that can be extended by VQE. The NISQ can output a calculated value correlated with the true value theoretically in any range. However, due to the limitations of hardware resources and computational costs, the use of VQE calculation performed by NISQ is currently limited to a certain range of compounds compared to the DFT calculation performed by the von Neumann architecture computer called a classical computer. At Step S2, the NISQ performs the VQE calculation when the DFT calculation cannot obtain a calculation result, and thus the database can be extended efficiently by using the NISQ.

(Step S3)

Referring to FIG. 5, after Step S2, the data processing device 10 searches the database 102a storing an increased amount of information increased at Step S1 for a new compound (Step S3). Step S3 is performed by the search unit 106 illustrated in FIG. 3. FIG. 13 is a diagram illustrating the operation of the search unit 106.

When, for example, a user inputs a desired physical property value "AX" of a physical property A via the input device 015 to the search unit 106, the search unit 106 inputs the physical property value "AX" to the trained model 102b as illustrated in FIG. 13. The trained model 102b estimates a structure of a compound X that may possibly have the physical property value "AX" of the physical property A. When, for example, the trained model 102b receives, from the search. unit 106, a physical property value "AX" of ionization potential as a physical property value of the physical property A, the trained model 102b outputs a character string indicating a chemical structure estimated to have the physical property value "AX". When the trained model 102b receives, from the search unit 106, a physical property value "AX" of electron affinity as a physical property value of the physical property A, the trained model 102b outputs a character string indicating a chemical structure estimated to have the physical property value "AX". Although not illustrated in the drawings, when the trained model 102b receives, from the search unit 106, a physical property value "AX1" of ionization potential and a physical property value "AX2" of electron affinity as a physical property value of the physical property A, the trained model 102b outputs a character string indicating a chemical structure estimated to have the physical property value "AX1" and the physical property value "AX2".

According to the embodiment, more efficient new compound search can be achieved by using the database 102a storing an increased amount of information increased at Step S2.

(Step S4)

Referring to FIG. 5, after Step S3, the data processing device 10 updates the database 102a with the new compounds found at Step S3 (Step S4). In the same manner as in Step S2, Step S4 is performed by the acquisition unit 103 and the storage unit 105 illustrated in FIG. 3.

At Step S4, the acquisition unit 103 (DFT calculation unit 103a) acquires a third calculated value of a new compound by DFT calculation. The storage unit 105 corrects, by using the first correction model (DFT correction model), the third calculated value acquired in a region including a region (region 1000) in which at least the first calculation method. (PFT) can obtain a calculation result, and stores the corrected. value in the database 102a as the true value of the physical property value of the new compound.

The acquisition unit 103 (VQE calculation instruction unit 103b) acquires a fourth calculated value by using the second calculation method (VQE) as a physical property value of the new compound in a region including the region (region 1100) in which at least the first calculation method cannot obtain a calculation result. The storage unit 105 corrects the fourth calculated value by using the second correction model (VQE correction model) and stores the corrected value in the database 102a as the true value of the physical property value of the new compound.

The following describes detailed operations of Step S4 with reference to FIG. 14. FIG. 14 is a flowchart illustrating the detailed operations of Step S4 in the flowchart in FIG. 5.

As illustrated in FIG. 14, upon receiving a new compound (Step S31), the DFT calculation unit 103a performs the DFT calculation on the new compound (Step S32), and the storage unit 105 determines whether the DFT calculation has obtained a calculation result (Step S33). If the DFT calculation obtains a calculation result (Yes at Step S33), the storage unit 105 corrects the DFT calculation result by using the DFT correction model (Step S34), and stores the corrected value in the database 102a as a true value of the physical property value of the new compound (Step S37).

If the DFT calculation has failed to obtain a calculation result (No at Step S33), the VQE calculation instruction unit 103b causes the quantum computing device 20 to perform the VQE calculation, and acquires a calculation result (Step S35). The storage unit 105 corrects the VQE calculation result by using the VQE correction model (Step S36), and stores the corrected value in the database 102a as the true value of the physical property value of the new compound (Step S37).

The true value of a physical property value of a new compound can be acquired by the processing at Step S4, and thus the amount of information stored in the database 102a can be further increased. If the true value is only limited to an experimental value not including a calculated value, the true value of the physical property value obtained at Step S4 is a predicted true value.

In the embodiment above, the DFT calculation and the VQE calculation are performed on a limited number of first compounds to obtain calculated values of ionization potential and electron affinity. The calculation results are compared with a limited number of true values to obtain correction models for correcting the calculation results that can be applied to a wide variety of molecules. In the embodiment, with the correction models for correcting the calculation results that can be applied to a wide variety of molecules, calculated. values of ionization potential and electron affinity of many second compounds are corrected to the true values. This process according to the embodiment above can increase the amount of information stored in the database 102a for use in new materials search.

In the embodiment, using the database 102a storing an increased amount of information can achieve more efficient compounds search. For a new compound, the true value of a physical property value can be obtained by using the correction models for calculation results that can be applied to a wide variety of molecules. In this regard, the amount of information stored in the database 102a can be further increased.

Although an embodiment of the present invention has been described, the present invention is not limited to the embodiment above and the constituents may be modified without departing from the spirit of the present invention for other embodiments. The constituents of the embodiment above may be combined as appropriate to embody various aspects of the invention. For example, some constituents may be eliminated from the constituents disclosed in the embodiment.

Modifications

The following describes modifications of the embodiment above.

(1) First Modification

In the processing at Step S2 the embodiment above, the calculation result (third calculated value) obtained by the DFT calculation in the region 1000 in which DFT can obtain a (valid) calculation result is corrected by the DFT correction model and stored in the database. In the processing at Step S2, the calculation result (fourth calculated value) obtained by the VQE calculation in the region 1100 in which DFT cannot obtain a calculation result is corrected by the VOE correction model and stored in the database. In the processing at Step S2, both DFT calculation result (third calculated value) and VQE calculation result (fourth calculated value) are obtained in the region 1200 in which DFT obtains an invalid calculation result, and the calculation result (fourth calculated value) obtained by the VQE calculation is corrected by the VQE correction model and stored in the database.

The boundary between the region 1200 and the region 1000 corresponds to the boundary between a range in which the DFT calculation result is correlated with the true value and a range in which the DFT calculation result is not correlated with the true value. Such a boundary is determined, for example, based. on a threshold set for a correlation coefficient or determined by a user. At or near the boundary, it may be unclear which is more appropriate as a true value, the corrected value of the third calculated value or the corrected value of the fourth calculated value.

The following describes the processing according to the first modification. Suppose that, for example, a DFT calculated value corresponding to the boundary between the region 1200 and the region 1000 is set to "A", and "α" is given as the in al setting or a user setting. In the first modification, if a DFT calculated value "Y1" of ionization potential of a second compound. "Z" satisfies "A−α≤Y1≤A+α", the storage unit 105 causes the display device 16 to display a corrected value "$Y1_{DFT}$" that is a corrected. value of "Y1" by the DFT correction model and a corrected. value "$Y2_{VQE}$" that is a corrected value of a VQE calculated value "Y2" of the second compound "Z" by the VQE correction model. The storage unit 105 causes the display device 16 to display the chemical structure of the second compound "Z". The user determines which is more appropriate, the corrected value "$Y1_{DFT}$" or the corrected value "$Y2_{VQE}$", based on the chemical structure, and selects the more appropriate corrected value. The storage unit 105 stores the corrected value selected by the user in the database 102a as the true value of the second compound "Z".

In the first modification, a DFT calculation result (third calculated value) included in the region 1200 may be corrected by the DFT correction model and stored in the database. In the first modification, if a DFT calculation result (third calculated value) is included in the region 1000 and the third calculated value falls within the range described above, the VQE calculation result (fourth calculated value) may be obtained, corrected by the VQE correction model, and stored in the database. The processing according to the first modification can acquire a more appropriate true value of a physical property value in the boundary region.

In the first modification, corrected values are selected by the user, but the corrected values may be selected automatically. In this case, for example, the search unit 106 performs data mining using the database 102a and estimates the value of ionization potential of the second compound "Z". The storage unit 105 then stores a value, out of "$Y1_{DFT}$" and "$Y2_{VQE}$", closer to the estimated value of the search unit 106 in the database 102a as the true value of the second compound "Z".

(2) Second Modification

In the processing at Step S2 in the embodiment above, the generation unit 104 may perform the following processing according to a second modification if a DFT calculation result (third calculated value) of a second compound is corrected by the DFT correction model and stored in the database 102a as a true value.

The generation unit 104 according to the second modification further acquires, via the VQE calculation instruction unit 103b, a VQE calculation result of the second compound whose true value has been obtained from the corrected value of the DFT calculation result corrected by the DFT correction model. The generation unit 104 then generates a second correction model (VQE correction model) by using the value stored as the true value and the VQE calculated value. The second correction model can be updated by optionally performing the processing according to the second modification, which can in turn increase the correction accuracy.

(3) Third Modification

In the embodiment above, the first calculation method is DFT and the second calculation method is VQE, but the calculation methods are not limited to these methods. The first calculation method and the second calculation method used in the data processing method. disclosed in the present specification may be any combination of calculation methods if the combination includes a first calculation method and a second calculation method that can obtain a calculation result in a region in which the first calculation method cannot obtain a calculation result. Examples of the first calculation method include calculation methods based on perturbation theory and coupled cluster theory. Examples of the second calculation method include quantum phase estimation.

(4) Fourth Modification

In the embodiment above, physical property values of ionization potential and electron affinity are calculated, but physical property values of any type may be calculated if the physical property values can be calculated by both first calculation method and second calculation method that can be used in the data processing method disclosed in the present specification.

(5) Fifth Modification

In the embodiment above, the trained model 102b learns the correlation between the chemical structure and IP, the chemical structure and EA, and the chemical structure and IP and EA to estimate a chemical structure having a desired IP, a chemical structure having a desired EA, and a chemical structure having desired IP and PA, but the embodiment is not limited to this. For example, a chemical structure having a third physical property (physical property B) different from IP or EA can be estimated by using the trained model 102b and a second trained model to be described below. The second trained model is generated by, for example, machine learning using, as training data, a list of compounds whose true value of IP, true value of EA, and true value of the physical property B are known. When the second trained model receives a desired value "BX" of the physical property B from the search unit 106, the second trained model outputs an IP value ($IP_{BX}$) and an EA value ($EA_{BX}$) that may possibly correspond to the physical property value "BX". The search. unit 106 then inputs $IP_{BX}$ and $EA_{BX}$ to the trained model 102b and acquires a character string indicating the chemical structure estimated to have the physical property value "BX". The true values of the physical properties IP and PA of the new compound found in this processing can be obtained by performing the processing at Step S4.

(6) Sixth Modification

The data processing system 1 according to the embodiment above includes the data processing device 10 and the quantum computing device 20. The data processing system 1, however, may include the functions or the data processing device 10 and the functions of the quantum computing device 20 in a distributed manner in a plurality of devices.

For example, the data processing system 1 may include a database building device including the acquisition unit 103, the generation unit 104, and the storage unit 105, a quantum computing device 20, a search device including the trained model 102b and the search unit 106, and a memory device storing the database 102a. The database 102a stored in the memory device may be an integrated database of a plurality of databases built by a plurality of database building devices.

The embodiment above may optionally be combined with the modifications above and the modifications may optionally be combined with one another.

The computer program executed by the data processing device 10 according to the embodiment above may be recorded and provided in a computer-readable recording medium such as a compact disc read only memory (CD-RCM), a flexible disk (FD), a magneto-optical disk, a compact disc recordable (CD-R), a digital versatile disc (DVD), a Blu-ray disc (registered trademark), and a universal serial bus (USB) memory as an installable or executable file, or may be provided or distributed via a network such as the Internet. The computer program may be embedded and provided in a non-volatile memory such as a ROM.

What is claimed is:

1. A data processing method comprising:

executing, using a von Neumann computer, a first calculation algorithm to calculate a first calculated value for each of a plurality of first compounds, wherein each of the plurality of first compounds has a known true physical property value;

executing, using a quantum computer, a second calculation algorithm to calculate a second calculated value for each of the plurality of first compounds, wherein the second calculation algorithm is capable of obtaining a result in a region where the first calculation algorithm is not valid;

generating, using a generation a device operably coupled to the von Neumann computer and the quantum computer:

a first correction model by comparing the first calculated values with the known true physical property values; and a second correction model by comparing the second calculated values with the known true physical property values;

executing, using a storage device:

receiving a third calculated value representing a physical property value of a second compound calculated by the von Neumann computer, and applying the first correction model to the third calculated value to generate a first corrected value;

receiving a fourth calculated value representing a physical property value of the second compound calculated by the quantum computer, and applying the second correction model, to the fourth calculated value to generate a second corrected value; and storing the first corrected value and the second corrected value in a database as surrogate true values of the physical property value of the second compound; and displaying using a display device, at least one of the first corrected value, the second corrected value, and a chemical structure of the second compound.

2. The method of claim 1, further comprising searching the database for a new compound having a certain feature.

3. The method of claim 2, further comprising:
storing the first corrected value of the third calculated value acquired in a region including a region in which at least the first calculation algorithm is valid as the true value of the physical property value of the new compound; and
storing the second corrected value of the fourth calculated value acquired by the second calculation algorithm in a region including a region in which at least the first calculation algorithm is invalid as the true value of the physical property value of the new compound.

4. The method of claim 2, wherein the searching for the new compound is performed using machine learning based on the database.

5. The method of claim 1, further comprising:
comparing the known true physical property value with the first calculated value and the second calculated value for each of the first compounds;
generating the first correction model in a region in which the first calculated value is correlated with the known true physical property value; and
generating the second correction model in a region in which the second calculated value is correlated with the known true physical property value.

6. The method of claim 1, wherein the second correction model is generated using the first corrected value stored in the database as the true value of the physical property value of the second compound.

7. The method of claim 1, wherein the known true physical property value of the first compound is an experimental value obtained experimentally.

8. The method of claim 1, wherein the first calculation algorithm is based on density functional theory, and the second calculation algorithm is based on variational quantum eigensolver.

9. The method of claim 1, wherein;
the first calculated value and the third calculated value are generated by causing the von Neumann computer to perform the first calculation algorithm; and
the second calculated value and the fourth calculated value are generated by causing the quantum computer to perform the second calculation algorithm.

10. The method of claim 9, wherein the quantum computer is a noisy intermediate-scale quantum device.

11. The method of claim 1, wherein the first calculation algorithm is based on density functional theory and the second calculation algorithm is based on quantum phase estimation.

12. A data processing device or system, comprising:
a von Neumann computer configured to calculate a first calculated value for each of a plurality of first compounds using a first calculation algorithm, wherein each of the plurality of first compounds has a known true physical property value;
a quantum computer configured to calculate a second calculated value for each of the plurality of first compounds using a second calculation algorithm, wherein the second calculation algorithm is capable of obtaining a result in a region where the first calculation algorithm is not valid;
a generation device operably coupled to the von Neumann computer and the quantum computer, the generation device configured to:
generate a first correction model by comparing the first calculated values with the known true physical property values; and
generate a second correction model by comparing the second calculated values with the known true physical property values;
a storage device configured to:
receive a third calculated value representing a physical property value of a second compound calculated by the von Neumann computer, and apply the first correction model to the third calculated value to generate a first corrected value;
receive a fourth calculated value representing a physical property value of the second compound calculated by the quantum computer, and apply the second correction model to the fourth calculated value to generate a second corrected value; and
store the first corrected value and the second corrected value in a database as surrogate true values of the physical property value of the second compound; and
a display device configured to display at least one of the first corrected value, the second corrected value, and a chemical structure of the second compound.

13. The data processing device or system of claim 12, wherein the storage device is configured to search the database for a new compound having a certain feature.

14. The data processing device or system of claim 13, wherein:
the storage device is configured to store the first corrected value of the third calculated value acquired in a region including a region in which at least the first calculation algorithm is valid as the true value of the physical property value of the new compound; and
the storage device is configured to store the second corrected value of the fourth calculated value acquired by the second calculation algorithm in a region including a region in which at least the first calculation algorithm is invalid as the true value of the physical property value of the new compound.

15. The data processing device or system of claim 13, wherein the search for the new compound is performed using machine learning based on the database.

16. The data processing device or system of claim 12, wherein the generation device is configured to:
compare the known true physical property value with the first calculated value and the second calculated value for each of the first compounds;
generate the first correction model in a region in which the first calculated value is correlated with the known true physical property value; and
generate the second correction model in a region in which the second calculated value is correlated with the known true physical property value.

17. The data processing device or system of claim 12, wherein the generation device is further configured to generate the second correction model using the first corrected value stored in the database as the true value of the physical property value of the second compound.

18. The data processing device or system of claim 12, wherein the known true physical property value of the first compound is an experimental value obtained experimentally.

19. The data processing device or system of claim 12, wherein the first calculation algorithm is based on density functional theory and the second calculation algorithm is based on variational quantum eigensolver.

20. The data processing device or system of claim 12, wherein:
   the first calculated value and the third calculated value are generated by causing the von Neumann computer to perform the first calculation algorithm; and
   the second calculated value and the fourth calculated value are generated by causing the quantum computer to perform the second calculation algorithm.

21. The data processing device or system of claim 20, wherein the quantum computer is a noisy intermediate-scale quantum device.

22. The data processing device or system of claim 12, wherein the first calculation algorithm is based on density functional theory and the second calculation algorithm is based on quantum phase estimation.

\* \* \* \* \*